(12) United States Patent
Kunz et al.

(10) Patent No.: US 6,478,886 B1
(45) Date of Patent: Nov. 12, 2002

(54) AGENT FOR SEALING METALLIC GROUND COATS, ESPECIALLY GROUND COATS CONSISTING OF ZINC OR ZINC ALLOYS

(75) Inventors: Volker Kunz, Trebur-Geinsheim (DE); Hermann Donsbach, Trebur-Geinsheim (DE); Burkhard Flamme, Hagen (DE)

(73) Assignee: Kunz GmbH, Trebur-Geisheim (DE)

( * ) Notice: Subject to any disclaimer, the term of this patent is extended or adjusted under 35 U.S.C. 154(b) by 0 days.

(21) Appl. No.: 09/647,541

(22) PCT Filed: Feb. 26, 1999

(86) PCT No.: PCT/DE99/00518
§ 371 (c)(1),
(2), (4) Date: Dec. 1, 2000

(87) PCT Pub. No.: WO99/51793
PCT Pub. Date: Oct. 14, 1999

(30) Foreign Application Priority Data

Apr. 1, 1998 (DE) .......................... 198 14 605

(51) Int. Cl.$^7$ .............................. C23C 22/48

(52) U.S. Cl. .................... 148/268; 148/279; 106/14.21; 252/389.31

(58) Field of Search ................................ 148/268, 279; 106/14.21; 252/389.31

(56) References Cited

U.S. PATENT DOCUMENTS 4,407,899 A * 10/1983 Hara et al. ................... 205/155
4,466,832 A * 8/1984 Yoshimura et al. ......... 106/626
5,741,552 A * 4/1998 Takayama et al. .......... 427/386

* cited by examiner

Primary Examiner—John Sheehan
Assistant Examiner—Andrew L. Oltmans
(74) Attorney, Agent, or Firm—Michael L. Dunn

(57) ABSTRACT

Agent for sealing metallic substrates, in particular zinc or zinc alloy substrates, characterized in that it consists of an aqueous dispersion of
  a) at least one silane derivative and
  b) a colloidal silica and/or colloidal silicate.
This agent may be used for a direct coating of metallic substrates without chromatation.

13 Claims, No Drawings

AGENT FOR SEALING METALLIC GROUND COATS, ESPECIALLY GROUND COATS CONSISTING OF ZINC OR ZINC ALLOYS

Iron parts such as screws, nuts, springs, clamps etc., and larger parts such as frames, balcony railings, fence posts or the like, are routinely protected against corrosion by galvanic or mechanical galvanisation. Protecting such galvanised articles or zinc or zinc alloy parts against corrosion is normally improved by chromating or passivating. Since chromium IV compounds are carcinogenic and poisonous and can no longer be used for environmental reasons, passivation has recently been carried out using chromium III. However, the use of chromium III compounds will also soon be reduced.

German patent DE-A-4 138 218 describes the subsequent treatment of chromated or passivated galvanisation coatings or zinc alloy coatings on steel parts using a post dipping medium which contains titanic acid esters and/or titanium chelates along with polysiloxanes containing organic functional groups, in an organic solvent. Alcohols or hydrocarbons are particularly mentioned as the organic solvents.

It has been shown that such aqueous media for subsequent treatment are not durable and are turned dark red by UV radiation. In addition, they cannot be over-painted, which constitutes a considerable disadvantage for many applications. For larger parts, such known subsequent treatment media provide insufficient protection against corrosion and their use of organic solvents constitutes a particular disadvantage.

The aim of the present invention is to provide a chromium-VI free sealing agent for protecting metallic substrates, in particular zinc or zinc alloy substrates, from corrosion, which agent is free of organic solvents and advantageously is suitable for over-painting.

The present invention provides an agent for sealing metallic substrates, in particular zinc or zinc alloy substrates, using an aqueous dispersion of:
 a) at least one silane derivative; and
 b) a colloidal silicic acid and/or a colloidal silicate.

Preferably, the silane derivative has general formula:

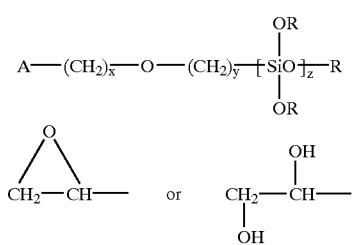

where A is the residue
x is a whole number from 1 to 6 and y is 0 or a whole number from 1 to 6, R, which may be identical or different, is hydrogen or a $C_1$–$C_6$ alkyl group and z is a whole number from 1 to 4.

This sealing agent can be free of organic solvents such as alcohols or hydrocarbons and produces excellent protection against corrosion for metallic substrates such as aluminium, zinc or zinc alloy substrates without the use of chromium-VI. In addition, this sealing agent can be over-painted and bonds well to the usual corrosion protection lacquers, meaning that thin coats of lacquer are sufficient, which is of advantage for small parts such as screws, nuts and the like, for example when the dimensional accuracy of threads has to be retained.

The aqueous sealing agent of the invention can be kept for many months and can be used at temperatures of 10° C. to 90° C., advantageously 20° C. to 30° C. or 40° C. to 50° C.

Preferably, in the above formula, x and y are whole numbers from 1 to 4; more preferably, x is 1 and y is 2 to 4, in particular 3. Preferably, R is a hydrogen atom or a methyl group. Preferably, A is the group $CH_2OH$—$CHOH$—.

Colloidal silicic acids in the form of sols or gels, in particular sols, are commercially available, for example under the trade name "Ludox" or "Levasil". Colloidal silicic acids are silicic acid salts, preferably lithium salts, known as "lithium polysilicate". The $SiO_2/Li_2O$ mole ratio in these colloidal silicic acid lithium salts is in the range 4.5 to 5.5, preferably in the range 4.8 to 5.2.

The colloidal material b) can be used to adjust the pH to achieve the desired pH by mixing appropriately. The use of lithium polysilicate or other anionic polysilicates, sols or gels, for example, results in an alkaline pH in the range 9 to 11, while using colloidal cationic $SiO_2$ produces an acidic pH. Mixing lithium polysilicate or other anionic polysilicates, sols or gels and colloidal cationic silica gel can produce any desired intermediate pHs.

The b:a weight ratio is in the range 1:3 to 3:1, in particular about 2:1. The water content of the inventive sealing agent is advantageously 5% to 95% by weight, particularly 20% to 90% by weight, more particularly 70% to 80% by weight.

More advantageously, the coefficient of friction of treated parts such as screws or nuts is improved by adding wax dispersions or wax pigments to the agent of the invention. This is particularly appropriate for alkaline, neutral or acidic sealing agents of the invention. To this end, the sealing agent of the invention can be ground with the corresponding wax, or anionic, cationic and/or non ionic wax dispersions can be mixed in, whereby any waxes can be used and fluorinated or fluorine-free formulations are possible.

For certain applications, it may be appropriate to control wetting of the substrate using surfactants such as polypropylene or polyethylene, polyethylene oxide or modified siloxanes as the surfactant. If necessary, organic binder dispersions can be added.

The sealing agent of the invention can be completely aqueous, without the need for the addition of organic solvents. However, the scope of the invention also encompasses adding small amounts of organic solvents for certain purposes, such as mono-, di- or trihydroxy alcohols, if this is environmentally permissible. The important fact is that the agent of the invention contains no chromium VI.

The sealing agent of the invention can be removed with hot alkaline or acidic solutions if applied incorrectly. The sealing agent can be applied using normal methods, such as dipping, spraying using a spray gun, or centrifugal applications. The sealing agent can be applied directly to the zinc or zinc alloy substrate, and if necessary also onto chromated, phosphated, passivated or coloured zinc or zinc alloy substrates. As mentioned above, the dried sealing agent of the invention can be over-painted, using normal organic resins and silicone resins. Preferably, aqueous systems are used. The agent of the invention bonds superbly to such top-coats. The formation of microscopic blisters of organic lacquers, for example on a scale of 8 to 20 μm, is practically non existent. Advantageously, water-miscible lacquers and coating systems are used for over-painting. The sealing agent of the invention can be used in connection with electrophoretic dip-coating lacquers which are anaphoretically or cataphoretically deposited. Cataphoretic dip-coating is known to produce better corrosion protection than anaphoretic dip-coating. The sealing agent of the invention increases the corrosion protection of anaphoretic dip coats and comparable results are obtained with phosphated, chromated, passivated or coloured zinc and zinc alloy substrates with cataphoretically deposited dip coats. There is no difference in results between static or drum coating application.

A further advantage lies in the fact that passivated or black zinc or zinc alloy coatings such as zinc-cobalt, zinc-iron, zinc-tin or zinc-nickel II can be sealed or the seal can be applied without passivation directly onto the substrate which can subsequently be lacquered. In combination with the subsequent lacquer layers, the sealed substrates exhibit very good corrosion protection durability in the range from 500 to 1500 h in the German standard DIN 50021-SS salt spray test and are chromium IV-free. The lacquer coatings can be applied by electrophoresis, spin coating, conventional spraying, conventional dipping or the like.

The construction described above of metal, in particular zinc or zinc alloy substrate plus seal plus lacquer, has excellent insulating properties and prevents contact corrosion when used on steel construction parts which are used in combination with magnesium or aluminium. The method by which the seal is applied produces a vapour barrier with the metal substrate, in particular the zinc or zinc alloy substrate. If the top-coat is damaged, the seal still provides the required contact corrosion protection.

EXAMPLE 1

| | |
|---|---|
| Commercially available hydrolysed 3-glycidyloxypropyltrialkoxysilane | 20% by weight |
| Lithium polysilicate | 40% by weight |
| Water | 40% by weight |

EXAMPLE 2

| | |
|---|---|
| Hydrolysed 3-glycidyloxypropyltrialkoxysilane, as in Example 1 | 20% by weight |
| Acidic to neutral cationic silica gel | 40% by weight |
| Water | 40% by weight |

EXAMPLE 3

| | |
|---|---|
| Hydrolysed 3-glycidyloxypropyltrialkoxysilane, as in Example 1 | 20% by weight |
| Lithium polysilicate | |
| Acidic to neutral cationic silica gel | 20% by weight |
| Water | 40% by weight |

The pH of compositions 1 and 3 was 9 to 11; that of composition 2 was 3 to 5. Mixing in appropriate proportions could be carried out to adjust the pH to an intermediate value such as a neutral pH.

EXAMPLE 4

| | |
|---|---|
| Hydrolysed 3-glycidyloxypropyltrialkoxysilane | 10% by weight |
| Glycidyloxytrimethoxysilane | 10% by weight |

| | |
|---|---|
| -continued | |
| Lithium polysilicate | 10% by weight |
| Propanol | 15% by weight |
| Water | 55% by weight |

What is claimed is:

1. An agent for sealing metallic substrates having a surface layer of zinc or zinc alloy, comprising an aqueous dispersion of:

a) at least one silane derivative having the general formula:

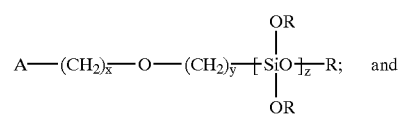

and b) a silicon composition consisting of colloidal lithium polysilicate where A is the residue

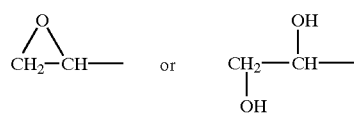

where x is a whole number from 1 to 6 and y is 0 or a whole number from 1 to 6, groups R, which may be identical or different, represent hydrogen or a $C_1$–$C_6$ alkyl group and z is a whole number from 1 to 4 and wherein the ratio of silicate to a) is from 1:3 to 3:1.

2. A sealing agent according to claim 1, where A is the group $CH_2OH$—$CHOH$—.

3. A sealing agent according to claim 1, where x is 1 to 4 and y is 1 to 4.

4. The sealing agent of claim 3 where x is 1.

5. The sealing agent of claim 1 where y is 3.

6. A sealing agent according to claim 1 where R is H or a methyl group.

7. A sealing agent according to claim 1 where the silane derivative is a hydrolysis product of 3-glycidyloxypropyltrialkoxysilane, glycidyloxytrimethoxysilane or mixtures thereof.

8. A sealing agent according to claim 2 where the silane derivative is a hydrolysis product of 3-glycidyloxypropyltrialkoxysilane, glycidyloxytrimethoxysilane or mixtures thereof.

9. A sealing agent according to claim 3 where the silane derivative is a hydrolysis product of 3-glycidyloxypropyltrialkoxysilane, glycidyloxytrimethoxysilane or mixtures thereof.

10. A sealing agent according to claim 1 further containing a dispersed wax.

11. A sealing agent according to claim 1 further containing a dispersed organic binder.

12. A method of coating an unchromated metallic substrate by directly coating it with a sealing agent of claim 6.

13. The method of claim 12 wherein subsequent to coating with the sealing agent, a top coat is applied.

* * * * *

UNITED STATES PATENT AND TRADEMARK OFFICE
CERTIFICATE OF CORRECTION

PATENT NO.    : 6,478,886 B1
DATED         : November 12, 2002
INVENTOR(S)   : Volker Kunz et al.

It is certified that error appears in the above-identified patent and that said Letters Patent is hereby corrected as shown below:

Column 4,
Line 63, change the dependency of Claim 12 from "6" to -- 1 --.

Signed and Sealed this

Twenty-fifth Day of March, 2003

JAMES E. ROGAN
*Director of the United States Patent and Trademark Office*